(12) United States Patent
Horn et al.

(10) Patent No.: US 7,124,574 B2
(45) Date of Patent: Oct. 24, 2006

(54) METHOD AND APPARATUS FOR A SUBSTANTIALLY COAXIAL INJECTOR ELEMENT

(75) Inventors: Mark D. Horn, Granada Hills, CA (US); Shinjiro Miyata, Malibu, CA (US); Shahram Farhangi, Woodland Hills, CA (US)

(73) Assignee: United Technologies Corporation, Hartford, CT (US)

( * ) Notice: Subject to any disclaimer, the term of this patent is extended or adjusted under 35 U.S.C. 154(b) by 324 days.

(21) Appl. No.: 10/309,833

(22) Filed: Dec. 4, 2002

(65) Prior Publication Data

US 2004/0107692 A1   Jun. 10, 2004

(51) Int. Cl.
   *F02K 9/00* (2006.01)
   *F02K 9/42* (2006.01)
   *F02K 9/72* (2006.01)

(52) U.S. Cl. .......................... 60/258; 60/205; 60/210; 60/217; 60/257; 239/398

(58) Field of Classification Search .................. 60/258, 60/205, 210, 213, 217, 257, 211; 239/398–434.5
See application file for complete search history.

(56) References Cited

U.S. PATENT DOCUMENTS

| | | | | |
|---|---|---|---|---|
| 3,036,428 A * | 5/1962 | Chillson | ....................... | 60/258 |
| 3,397,537 A * | 8/1968 | Green, Jr. | ...................... | 60/258 |
| 3,468,487 A * | 9/1969 | Warren | ....................... | 239/403 |
| 3,662,547 A * | 5/1972 | Paine et al. | ...................... | 60/258 |
| 3,662,960 A | 5/1972 | Mitchell et al. | | |
| 4,036,434 A * | 7/1977 | Anderson et al. | ............... | 239/8 |
| 4,621,492 A | 11/1986 | von Pragenau | | |
| 4,707,983 A * | 11/1987 | Gillon, Jr. | ..................... | 60/258 |
| 5,054,287 A * | 10/1991 | Schneider | ..................... | 60/240 |
| 5,172,548 A * | 12/1992 | Dubedout et al. | ............. | 60/258 |
| 5,265,415 A | 11/1993 | Cox, Jr. | | |
| 5,404,715 A * | 4/1995 | Vuillamy et al. | .............. | 60/257 |
| 5,566,544 A * | 10/1996 | Paulus et al. | .................. | 60/258 |
| 5,603,213 A * | 2/1997 | Sion et al. | ..................... | 60/258 |
| 5,771,579 A * | 6/1998 | Farhangi et al. | .......... | 29/890.01 |
| 5,794,435 A * | 8/1998 | Jones | ........................... | 60/251 |
| 5,857,323 A * | 1/1999 | Beveridge et al. | ............. | 60/258 |
| 5,899,388 A | 5/1999 | Sion et al. | | |
| 5,941,062 A * | 8/1999 | Koppel et al. | ................. | 60/247 |
| 5,983,626 A * | 11/1999 | Stahn et al. | ................... | 60/258 |
| 6,244,040 B1 * | 6/2001 | Adzhian et al. | ............... | 60/258 |
| 6,253,539 B1 * | 7/2001 | Farhangi et al. | .............. | 60/211 |
| 6,351,939 B1 * | 3/2002 | Buddenbohm et al. | ........ | 60/204 |
| 6,918,243 B1 * | 7/2005 | Fisher | ......................... | 60/211 |

\* cited by examiner

*Primary Examiner*—William H. Rodriguez
(74) *Attorney, Agent, or Firm*—Harness Dickey & Pierce P.L.C.

(57) ABSTRACT

A system to provide a two piece robust fluid injector. According to various embodiments, the fluid injector is a fuel injector for a combustion engine. The injector includes two coaxially formed annuluses. One annulus is formed in a face plate and the second annulus or hole is defined by a tube extending through the face plate. The tube extends through the face plate in a portion of a through bore which also is used to define the second annulus. The second annulus is formed using a throughbore through which the tube extends. This allows the second annulus to always be formed inherently and precisely substantially coaxial with the first annulus. Moreover, the second annulus can be formed with a much greater tolerance than if other independent components needed to be added.

30 Claims, 3 Drawing Sheets

METHOD AND APPARATUS FOR A SUBSTANTIALLY COAXIAL INJECTOR ELEMENT

STATEMENT REGARDING FEDERALLY SPONSORED RESEARCH OR DEVELOPMENT

The Invention described herein was made in the performance of work under NASA Contract No. NAS8-40894 and is subject to the provisions of Section 305 of the National Aeronautics and Space Act of 1958 (72 Stat.435; 42 U.S.C. 2457).

FIELD OF THE INVENTION

The present invention relates to fuel injectors for combustion systems, and particularly for rocket combustion systems.

BACKGROUND OF THE INVENTION

In a gas combustion engine a fuel is generally combusted with an oxidizer. Both the fuel and the oxidizer are provided to a combustion chamber where the combustion occurs. The combustion may either be caused by an ignition spark or some other means for igniting the mixture.

One system for providing the fuel and oxidizer to a combustion chamber involves providing a fuel inlet and an oxidizer inlet. In these cases, the fuel and oxidizer are provided through separate inlets or ports to the combustion chamber. The fuel inlet and the oxidizer inlet are generally oriented such that the flow of fuel and flow of oxidizer will interfere with one another to substantially intermix before combustion occurs.

In engines that include dense injector layouts or high outputs, the fuel inlet portion and the oxidizer inlet portion may be substantially coaxial. Therefore, the fuel and the oxidizer are provided along a substantially similar axis with an injector element. For example, concentric annuluses are formed where an inner annulus provides the oxidizer, while an outer annulus, substantially surrounding and coaxial with the first annulus, provides the fuel. As the oxidizer and fuel exit their respective ports, shear forces between the two flows are created and cause the fuel and oxidizer to substantially mix. After mixing, combustion occurs to produce the energy required.

One application for such a high output engine is a rocket engine. One example of a coaxial injector element for a rocket engine includes a central oxidizer post or tube, which forms the oxidizer inlet, fitted into a bore of a faceplate. An annulus is formed around the oxidizer tube and a fuel sleeve or face nut is placed into the bore to provide the dimensions of the fuel inlet. These systems are generally complex because they require an additional component to form the injector system. In addition, the face nuts and fuel sleeves are generally centered and aligned from the oxidizer post. Thus, the oxidizer post must be substantially fixed prior to the installation of the face nut or fuel sleeve. Moreover, the fuel sleeves add an additional complex machined component. In addition, the face nut cannot survive the demanding thermal environment in some systems. Further disadvantages of these two systems include that they are not easily scaled down for smaller or more compact injector systems and engines. Machining these components becomes significantly more complex and costly at smaller and smaller tolerances and sizes.

Another example of a coaxial injector provides centering elements on the oxidizer post itself. Features or tabs are included on the oxidizer post that engage features or detents on the face plate to insure a proper alignment and centering of the oxidizer post. This system generally results in high injector post costs, while also making it more difficult to place the tabs properly on the oxidizer post as the oxidizer post size is reduced. The tabs must be precisely placed on the post because they are the only alignment means of the post.

In a coaxial injector system, the flow rate of the fuel and the oxidizer are controlled by selecting appropriate annulus sizes and ratios of the fuel annulus size relative to the oxidizer annulus size. Moreover, precise placement of the oxidizer tube is desired so that the proper quantities of oxidizer and fuel are provided at the injection plane to allow a substantially complete and quick combustion. Therefore, it is desired to provide a system that allows for precise tolerancing of the injector flow features while decreasing the complexity and cost of the injector system. Also a system is desired that is substantially robust so that it remains in alignment during use in rigorous applications, such as in an application as a rocket engine.

SUMMARY OF THE INVENTION

The present invention relates to an injection system having a coaxial injector element for a combustion chamber. The injector system provides a face plate that includes a first or central through-bore to receive an injector or oxidizer post. A second annulus is formed around and coaxially with the first bore to provide a fuel annulus around the injector post. Secondary fuel inlets or passageways interconnect the fuel annulus and a fuel supply so that fuel is provided to the annulus to be mixed with the oxidizer to combust in the combustion chamber. Alternatively, the fuel may be provided through the central injection tube or post and the oxidizer provided through the passageways into the annulus around the post.

A first preferred embodiment of the present invention provides a space craft to be launched from a surface. The space craft includes fuel and oxidizer propellant sources, a combustion chamber, and a face plate having a propellant side and a combustion side. Formed in the face plate is a propellant injector. The propellant injector includes a first propellant annulus or hole and a second propellant annulus defined substantially coaxial with the first propellant annulus or hole. The second propellant annulus is defined by the faceplate. The propellant injector allows propellants (fuel and oxidizer) from the propellant sources to be injected into the combustion chamber.

A second preferred embodiment of the present invention provides an injector to inject a fluid into a combustion chamber of a combustion system. The injector includes a faceplate having a first side and a second side and a cannula extending between the first side and the second side. A propellant tube defines a first propellant annulus adapted to engage a portion of the cannula. The faceplate defines a second propellant annulus substantially concentric with the propellant tube. The propellant tube and the second propellant annulus define paths to deliver the propellants to the combustion chamber in a selected manner.

A third preferred embodiment of the present invention provides a rocket engine including a faceplate that has a propellant side and a combustion side. An injector is formed in the faceplate of the rocket engine includes a throughbore extending between the propellant side and the combustion side. The injector includes a propellant tube that extends through a portion of the throughbore. A propellant annulus is defined in the faceplate around the throughbore wherein a center of the throughbore defines a center of the propellant annulus. A passageway extends from the propellant side of the faceplate to the propellant annulus. A propellant flows from the propellant side to the combustion side though the injector.

A fourth preferred embodiment of the present invention includes a method of forming an injector for a combustion powered engine. The method includes providing a faceplate having a first side and a second side, and forming a throughbore in the faceplate that extends between the first side and the second side. A portion of the throughbore is enlarged to form a first propellant annulus. A second propellant annulus is then formed. A propellant is able to flow through the first propellant annulus and the second propellant annulus.

A fifth preferred embodiment of the present invention provides a method of forming an injector for a combustion powered engine. The method includes providing a faceplate having a first side and a second side, and forming a throughbore in the faceplate to extend between the first side and the second side. A first propellant annulus is formed by enlarging a portion of the throughbore by guiding a cutting bit into the faceplate with the throughbore. A propellant tube is disposed in the throughbore to form a second propellant annulus. A passageway is formed in the faceplate between the first side and the first propellant annulus.

It will also be understood that the present invention can be applied to various other applications besides rocket engines or injector systems for combustion systems. In particular, any application which would require two fluids to be injected into a common area can be used in conjunction with the present invention. In particular, any system which desires to provide a highly compact injector face that is both densely packaged with injector ports and highly reliable may be used in conjunction with the present invention.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT(S)

The following description of the preferred embodiment(s) is merely exemplary in nature and is in no way intended to limit the invention, its application, or uses. Although the following description describes the present invention exemplarily in conjunction with a rocket engine combustion system, the present invention will be understood not to be so limited. In particular, although the present invention as described is to provide a system to inject two propellants through an injector face into a combustion chamber, it will be understood that the present invention can be used to inject two fluids into any common container. Therefore, the present invention is not limited to solely being used with rocket systems.

Figure 1:
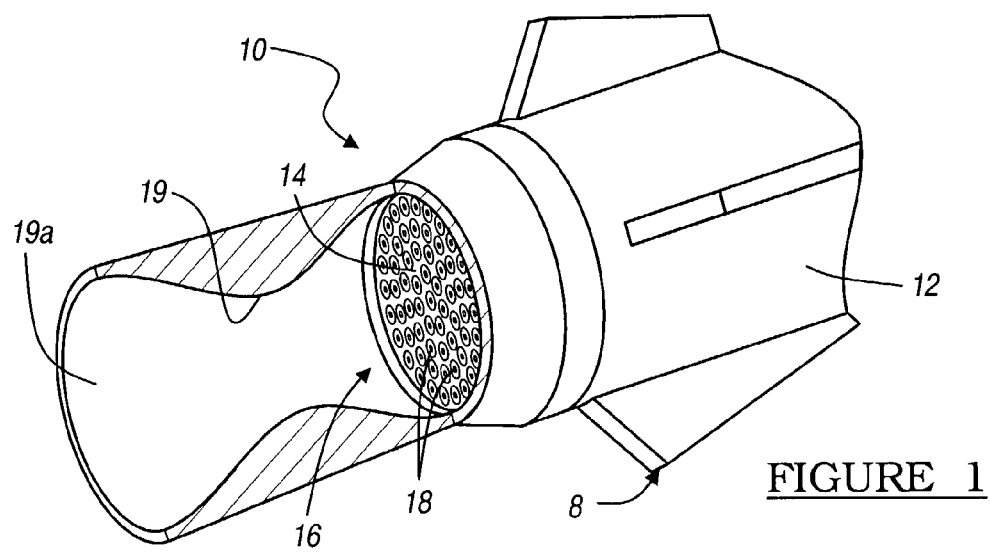
FIG. 1 is a perspective cutaway view of a spacecraft including an injector according to a preferred embodiment of the present invention.

With reference to FIG. 1, a rocket or spacecraft 8 includes a rocket engine 10 in accordance with a preferred embodiment of the present invention. The rocket engine 10 is provided with a fuel or propellant compartment or supply 12 and a face plate 14. The face plate 14 separates the propellant compartment 12 from a combustion chamber 16 of the rocket engine 10. Formed in the face plate 14 are a plurality of coaxial injectors 18. It will be understood that the face plate 14 may include any number of the coaxial fuel injectors 18 depending upon the area of the face plate 14 and other operational factors such as the size of the injector 18 thrust required from the engine 10. For example, it may be desirable to provide a large number of the injectors 18 per unit thrust for high performance engines and a lower number for lower cost engines. In addition, the coaxial injectors 18 may be varied in size depending upon the particular rocket engine 10. Propellants are injected into the combustion chamber 16 where they combust. Gases then expand through a throat 19 and a nozzle 19a. This provides thrust to the spacecraft 8.

Figure 2:
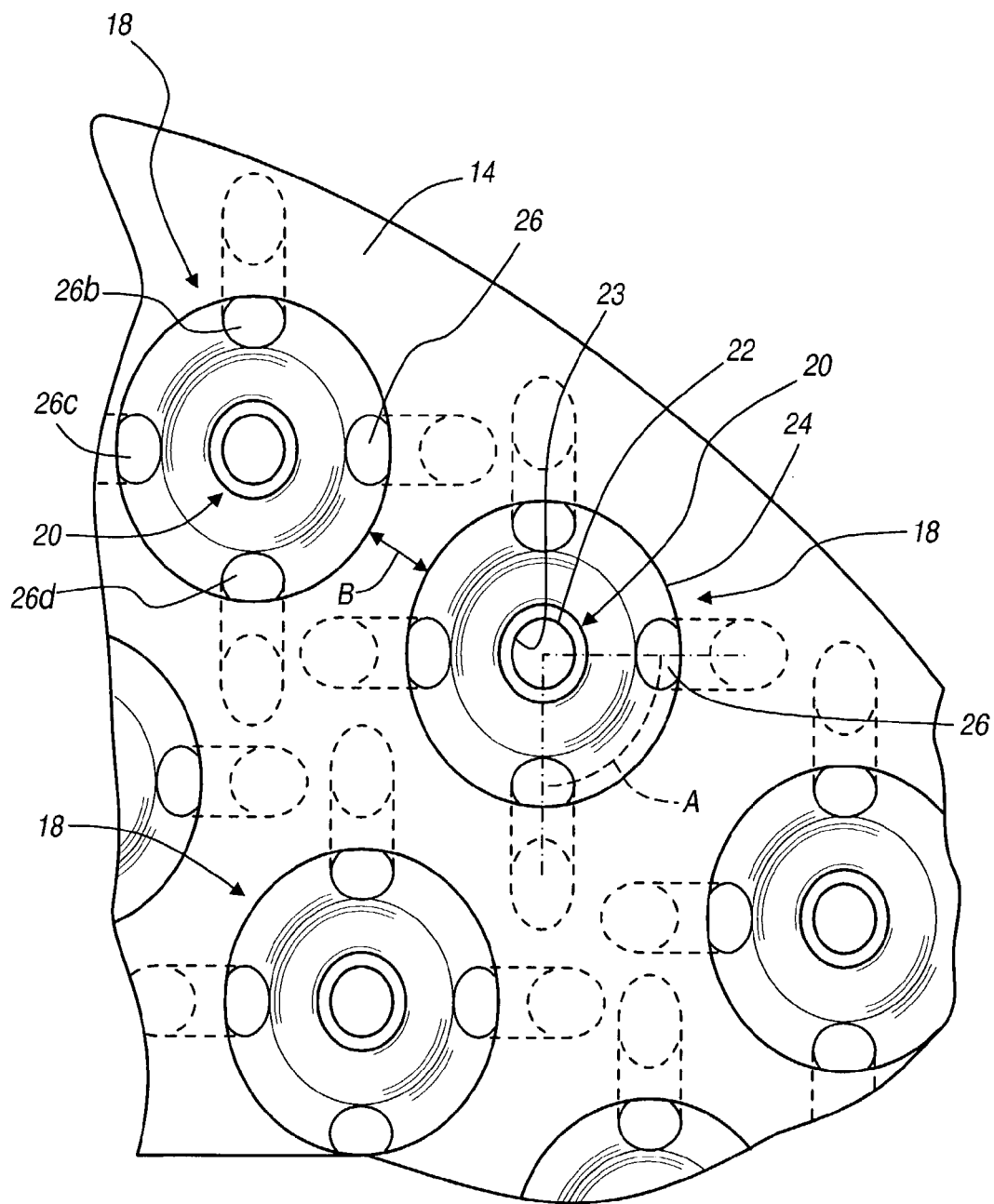
FIG. 2 is a detailed plan view of the face plates of an engine in the spacecraft of FIG. 1.

With reference to FIG. 2, an enlarged, detailed view of a portion of the face plate 14 including a sub-plurality of the fuel injectors 18 is illustrated. Each fuel injector 18 generally includes an injector or propellant post 20 that defines a first annulus or hole 22. The injector post 20 may include a drawn centerless rod, for example a tube, which is disposed in the injector 18. The annulus 22 is defined by an inside wall 23 of the injector post 20. Surrounding the injector post 20 and substantially coaxial therewith, as described more fully herein, is a face plate annulus or second injector annulus 24. In an exemplary embodiment, an oxidizer is provided through the injector post 20, and a fuel is provided through the second injector annulus 24 during the operation of the engine 10. Therefore, the injector post 20 may also be referred to as an "oxidizer" post 20 and the second annulus 24 may also be referred to as a "fuel" annulus 24. It will be understood, however, that the fuel may be provided through the injector post 20, while the oxidizer is provided through the second injector annulus 24 and the word designations of each herein are simply exemplary.

A plurality of propellant inlets or passageways 26, also referred to as fuel inlets 26, are formed in the face plate 14 to provide an interconnection or communication between the fuel annulus 24 and the propellant or fuel supply 12. Generally each fuel annulus 24 includes four passageways 26a, 26b, 26c, and 26d. Each of the passageways 26 are formed at an angle A, generally at approximately 90° intervals, around the injector post 20. Nevertheless, it will be understood that various other numbers of the passageways 26 may be provided and these may be provided at a different angular offset from each other. For example, if only three passageways 26 are provided, they may be provided at approximately 120° circumferential intervals from each other about an axial center of the injector 18.

The fuel injectors 18 are generally formed in the face plate 14 in a selected density. Between each injector 18 is an injector distance B. The injector distance B is generally defined as the distance between the exterior of adjacent fuel annuluses 24. The injector distance B may vary depending upon the application of the system and the size of the fuel annuluses 24. Moreover, the injector distance B may be dependent upon the material from which the face plate 14 is formed. Exemplary materials from which the face plate 14 may be formed include copper, stainless steel or a variety of superalloy materials. In some cases, the faceplate may also be fabricated from a porous metal or ceramic construct to allow additional cooling by secondary flow of the propellant through the porous surface.

Figure 3:
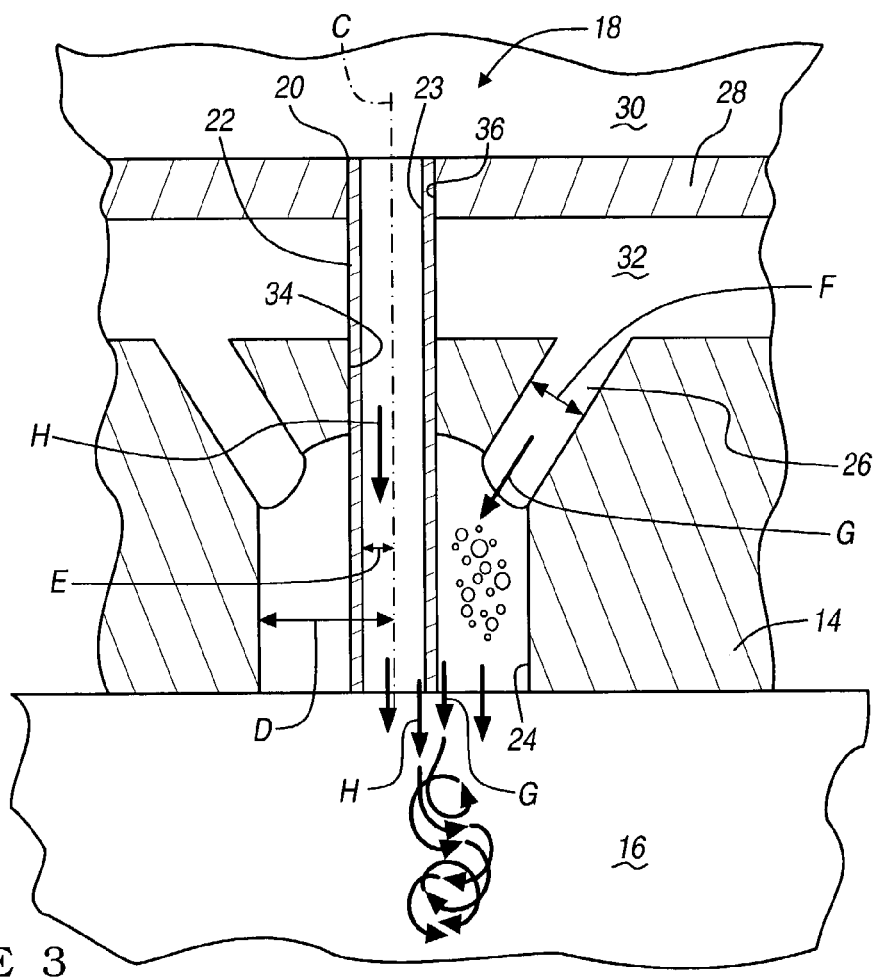
FIG. 3 is a cross-sectional view of an injector element according to a preferred embodiment of the present invention.

With reference to FIG. 3, a single injector 18 is illustrated. The injector 18 includes the fuel annulus 24 formed in the face plate 14 and the injector post 20 extending through the fuel annulus 24. The combustion chamber 16 is located on the downstream or combustion side of the face plate 14. An interpropellant plate 28 is located on an upstream side of the injector 18. The interpropellant plate 28 separates the propellant supply 12 into a first propellant supply cavity or supply 30 and a second propellant supply or cavity 32, before the two are mixed and combusted in the combustion chamber 16. The passageways 26 interconnect the second propellant cavity 32 and the fuel annulus 24. It will be understood, however, that when the fuel is provided through the injector post 20, then fuel is provided in the first propellant cavity 30 and the oxidizer is provided in the second propellant cavity 32.

Figure 4A:
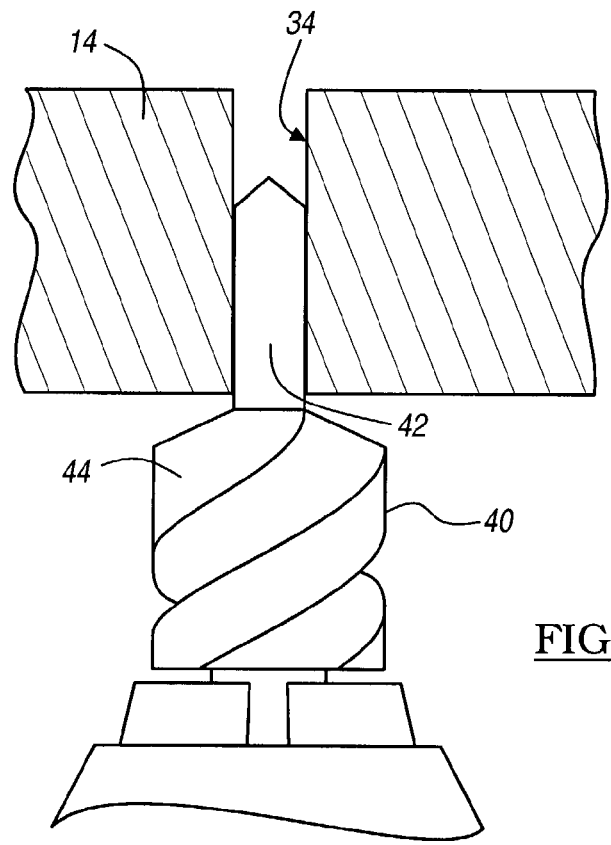
FIGS. 4a and 4b illustrate a preferred method of forming the injector according to a preferred embodiment of the present invention.

Referring to FIGS. 3 and 4a, injector post 20 fits within a center propellant post bore 34 formed in the face plate 14. The allowable tolerances between the center propellant post bore 34 and an outer diameter of the injector post 20 are generally extremely small. Typically, the difference between an internal diameter of the post bore 34 and an external diameter of the injector post 20 is less than about 0.02 mm. The injector post 20 extends to the interpropellant plate 28. The interpropellant plate 28 includes a second post bore 36 that includes a generally close tolerance relative to the diameter of the injector post 20. Bonding the injector post 20 to the interpropellant plate 28 also holds the injector post 20 in position. Furthermore, the injector post 20 may be bonded to the interpropellant plate 28 to insure a substantial seal between the first propellant cavity 30 and the second propellant cavity 32. The injector post 20 may also be bonded to the face plate 14 for additional rigidity and structural strength. The injector post 20, however, may also float within the center post bore 34 due to the very small tolerance between the center post bore 34 and the injector post 20, thereby removing a fabrication step. The injector post 20 may be bonded to the interpropellant plate 28 using appropriate methods, such as welding or other generally known bonding methods.

Referring further to FIG. 3, each of the portions of the injector 18 including the injector post 20, the passageways 26, and the fuel annulus 24 each may be provided with specific diameters and sizes to provide the required amount of fuel and oxidizer to the combustion chamber 16 at the selected time. Moreover, the injector post 20 and the fuel annulus 24 substantially share a central axis C, thereby making them substantially co-axial. Nevertheless, the fuel annulus 24 includes a fuel annulus radius D, that is substantially different and larger than an injector post radius E of the injector post 20. The fuel annulus radius D may be selected depending upon the needed flow rate of the fuel through the fuel annulus 24. It will be understood that flow rates may also depend on physical properties, such as density, of the various propellants. In addition, the ratios of the fuel annulus radius D to the injector post radius E may be selected to assure an appropriate or desired flow of both the fuel and the oxidizer to the combustion area 16. Moreover, a passageway diameter F of the passageways 26 can be selected to allow a specific amount of fuel into the fuel annulus 24. Varying the passageway diameter F selectively varies the amount of fuel provided to the fuel annulus 24. To insure that a substantially constant or full flow of fuel is provided through the fuel annulus 24, the passageways 26 have a suitable passageway diameter F formed in the face plate 14. Alternately, the passageway diameter F may be increased to provide an aggregate flow area substantially larger than the fuel annulus area 24. In this fashion, the fuel annulus 24 area becomes the controlling feature for the propellant flow rate.

Figure 4B:
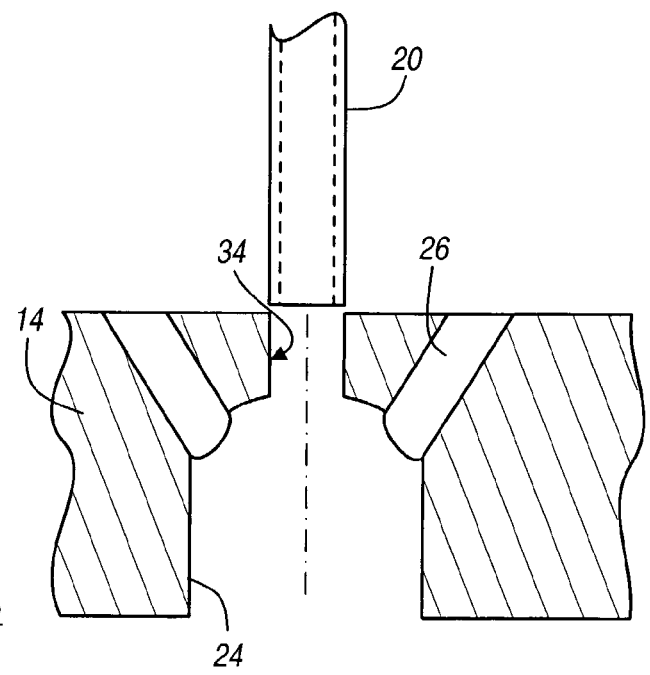

With reference to FIGS. 4a and 4b, an exemplary method of forming the substantially coaxial fuel injector 18 is illustrated. A portion of a material is first formed into the face plate 14. The materials for the face plate 14 do not significantly react to the heat fluxes that are required and sustained during the operation of rocket engine 10. Therefore, the size of a bore or cut formed into the material of the face plate 14 does not substantially change over time. The first through bore or post bore 34 is formed in the face plate 14. Appropriate methods, such as milling or plunge electrode electro discharge machining (EDM), are used to form the post bore 34.

After the post bore 34 is formed, which is selected to have a suitably close tolerance relative to the injector post 20 to be installed later, a counterbore bit 40 is used to form the fuel annulus 24. The counterbore bit 40 may include a pilot portion 42 and a counterbore or cutting portion 44. The pilot portion 42 also includes relatively close tolerances with the post bore 34. Therefore, the counterbore bit 40 is provided substantially coaxial with the post bore 34 during use.

The counterbore portion 44 forms from a counterbore in the faceplate 14 that defines the fuel annulus 24. As one skilled in the art understands the counterbore can be formed in the faceplate in any appropriate manner with the counterbore bit 40. The counterbore bit 40 can engage the faceplate 14 and remove a selected amount of material, as illustrated in FIGS. 4A and 4B to form the second injector annulus 24 which can includes a counterbore in the faceplate 14. The counterbore firmed in the faceplate 14 can include a wall and end surface that define the second injector annulus 24.

Although the post bore 34 and the second injector annulus 24 can be generally coaxial, they do not need to be the same size, geometry, depth, or the like, as illustrated in FIG. 4B. The second injector annulus 24 can be formed coaxially with the post bore 34 with the counter bore bit 40 to include an appropriate volume, including a depth below the face or surface of the faceplate 14. It will be understood, as illustrated in various figures (e.g. FIG. 4B) that the second injector annulus can include a side wall and a bottom defined by the faceplate 14 and formed as a counterbore with the counterbore bit 40.

Once cutting portion 44 of the counterbore bit 40 has produced the fuel annulus 24, it is removed from the face plate 14. This provides a convenient and efficient method to insure that the injector post 20, which is inserted into the post bore 34, is substantially coaxial with the fuel annulus 24. Generally, the center axis of the injector post 20 and the center axis C of the fuel annulus 24 are no more than about 0.02 mm apart. Therefore, the injector post 20 and the fuel annulus 24 are precisely coaxial.

After the fuel annulus 24 has been formed, the passageways 26 are formed in the face plate 14. The passageways 26 allow for the flow of fuel to the fuel annulus 24. Each passageway 26 may be formed using generally known methods, for example, wire EDM, plunge electrode EDM, milling, or Electro Chemical Machining (ECM). The methods used are principally dictated by injector design considerations.

Once the passageways 26 are formed, the injector post 20 may be inserted into the post bore 34. The injector post 20 simply includes a centerless drawn metal portion that is essentially a hollow tube. Because the hollow tube has exterior dimensions that are substantially close to the diameter of the post bore 34, no other alignment means or portions are necessary to ensure proper centering and alignment of the injector post 20. The injector post 20 is also properly aligned and centered relative to the fuel annulus 24 because the fuel annulus 24 is formed off of the post bore 34 which the injector post 20 substantially fills. Therefore, simply inserting the injector post 20 through the post bore 34 insures a substantially coaxial alignment of the injector post 20 to the fuel annulus 24. The injector post 20 may then be bonded to the face plate 14 at the post bore 34, if desired. Because the injector post 20 is bonded to the interpropellant plate 28, it need not be bonded to the face plate 14.

Because the post bore 34 and the fuel annulus 24 are both formed using a single bore, the two are always substantially aligned coaxially. The face plate 14 itself is used to produce the fuel annulus 24, which is coaxial with the post annulus 22 to provide a proper and efficient delivery of propellants to the combustion chamber 16. Because no additional portions are required to be installed onto the face plate 14, the fuel annulus 24 is always substantially coaxial with the post bore 34. This also provides for substantially efficient and robust fabrication of small injectors. Small injectors generally may include a fuel annulus radius D of generally less than about 1.0 mm with an annular gap of 0.02 mm. This relatively small size allows a large plurality or high density of injectors 18 to be placed on a small face plate 14 for small rocket engines 10. A small face plate 14 generally includes an area of less than about 0.01. The injectors 18 can easily be fabricated in such small face plates. It will be understood, however, that the injector 18 may be used with virtually to any size engine and face plate.

Moreover, because no additional elements form the fuel annulus 24, the flow rate of the fuel through the fuel annulus 24 can be more precisely determined and selected. The fuel annulus radius D determines the flow rate of the fuel through the fuel annulus 24. To change the fuel annulus radius D requires only that a different size counterbore bit 40 be selected. Therefore, the fuel annulus radius D can be quickly and efficiently changed to provide the optimum flow rate of the fuel through the fuel annulus 24. Moreover, the size of the fuel annulus 24 is determined in one machining step.

Also because the fuel annulus radius D is determined by the counterbore bit 40, which is centered using the pilot portion 42 and the post bore 34, the small fuel injectors 18 may be formed that are substantially coaxial. Because the efficiency of the fuel injectors 18 is partially dependent upon the fuel annulus radius D and the ratios between the fuel annulus radius D and the injector post radius E, producing small diameter fuel injectors 18 with only the counterbore bit 40 is highly efficient.

Moreover, the density of the injectors 18 can be easily increased on the face plate 14 to increase the performance of the rocket engine 10. Generally, combustion performance efficiencies exceeding 99% may be obtained by use of the fuel injector 18. In addition, because the fuel annulus 24 is determined by the counterbore bit 40, the flow of the fuel through the fuel annulus 24 can be more accurately controlled, another critical requirement for high performance injectors.

Returning to FIG. 3, the operation of the injector 18 will be described. The fuel supplied from the fuel supply 32 flows through the fuel inlet 26 as indicated by fuel flow arrows G. The fuel then flows out of the fuel annulus 24. The oxidizer flows from the oxidizer supply 30 through the oxidizer post 20 in the direction of oxidizer flow arrow H. As the oxidizer exits the oxidizer post 20 it interacts with the fuel flow G to create shear forces. These shear forces cause the two flows G and H to substantially mix and intermingle in the combustion chamber 16. It is these flow rates and shear rates that are substantially controlled by the fuel annulus radius D and the injector post radius E. Varying these radii vary the flow rates and injection velocities of the fuel and the oxidizer and vary the shear forces of the two as they exit their respective annuluses. Therefore, the efficiencies and flow rate of the injector 18 can be controlled by varying these radii. Nevertheless, the oxidizer post 20 and the fuel annulus 24 must be substantially coaxial to insure that the flows interact properly. Moreover, the proper shear forces are required so that the fuel and oxidizer mix substantially thoroughly in the combustion chamber 16. Having a proper mixture increases the efficiency of the combustion allowing for a more efficient production of thrust energy by the engine 10.

Therefore, the small injector 18 can be formed in a face plate of a rocket engine 10 to provide a substantially tightly packed face plate. Including a large plurality of the fuel injectors 18 provides a more efficient engine. Moreover, the fuel injector includes a center propellant post 20 in the fuel annulus 24 defined by the face plate 14. This provides a robust injector 18 and engine 10 because there are few parts that are moveable. In addition, longevity of the injector 18 is increased because the fuel annulus 24 is formed directly in the face plate 14, thereby creating a substantially durable and finely tuned injector, that can be tightly packed into the small rocket engine 10.

Although the preceding description has exemplarily described the coaxial injector 18 for a rocket engine 10, it will be understood that the coaxial injector 18 can inject two fluids into any common container. Specifically, it is not required that the coaxial injector 18 inject two fluids into a combustion chamber 16, but rather the coaxial injector 18 can inject two fluids into any container. For example, the coaxial injector can provide an injection system for reforming fuel for systems such as fuel cells which use reformed fuel to produce hydrogen.

The coaxial injector 18 allows for a densely packaged injector system to allow for an efficient use of space in various systems. Other systems can also gain the advantage from using the coaxial injector 18. Generally, the coaxial injector 18 can be used in any system that requires two fluids to be injected from separate sources into a common chamber. The common chamber may be sealed or allow the two fluids to pass through for additional processing. Regardless, the coaxial injector 18 may be used outside of rocket engines and fuel conmbustion.

Moreover, the coaxial injector 18 allows for two fluids to be substantially mixed during the injection process to ensure a substantially thorough mixture once the two fluids are injected into the common container. For example, the coaxial injector 18 can be placed in an injection plate to inject two fluids into a closed chamber, similar to the combustion chamber 16, but substantially sealed therefore not allowing any of the fluids to exit the chamber. Once in the mixing chamber, the two fluids are substantially mixed for further processing.

The coaxial injector 18 allows for a relatively small injector face plate and for a substantially dense packing of the coaxial injectors 18. The coaxial injectors 18 also allow precise control of the fluids flowing through the coaxial injectors 18. Therefore, it is understood that the present invention is not limited to use in the rocket engine 10. Rather, the coaxial injectors 18 can be used in any system where it is desired to substantially mix two fluids into a common container or area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A space craft engine, comprising:
   a propellant source;
   a combustion chamber;
   a face plate having a propellant side and a combustion side;
   a propellant injector formed in said faceplate, including:

a first propellant annulus extending through said faceplate;

a second propellant annulus defined by a counterbore in said faceplate arranged substantially coaxial with said first propellant annulus; and wherein said coaxial arrangement of said second propellant annulus relative to said first propellant annulus allows a propellant from said propellant source to be injected into said combustion chamber and thoroughly intermixed prior to being combusted;

an inter-propellant plate to divide a first propellant and a second propellant in said propellant source;

said first propellant being injected into said combustion chamber through said first propellant annulus and said second propellant being injected into said combustion chamber through said second propellant annulus; and wherein said first propellant includes an oxidizer and said second propellant includes a fuel.

2. The space craft engine of claim 1, wherein:

said faceplate includes a throughbore through which said elongated tube extends; and said second propellant annulus is formed from said throughbore.

3. The space craft engine of claim 2, further comprising:

a passageway defined in said faceplate so that a volume of propellant is able to flow to said combustion chamber through said second propellant annulus.

4. The space craft engine of claim 1, wherein a radius of said second propellant annulus is adapted to control the flow of a volume of propellant from said propellant source to said combustion chamber.

5. A space craft engine comprising:

an injector to inject a propellant into a combustion chamber of a combustion system, including:

a faceplate having a first side and a second side and a bore extending between said first side and said second side;

a propellant tube defining a first propellant annulus adapted to engage a portion of said bore;

said faceplate defining a second propellant annulus substantially concentric with said propellant tube; and wherein said propellant tube and said second propellant annulus define a path to deliver a volume of propellant to a combustion chamber.

6. The space craft engine of claim 5, further comprising:

a passageway defined though said faceplate extending from said first side of said faceplate to said second propellant annulus; and wherein said passageway is adapted to allow a selected flow rate of the propellant to said second propellant annulus.

7. The space craft engine of claim 5, wherein a radius of said second annulus defines a flow rate of said propellant through said second propellant annulus; and wherein a ratio of a radius of said propellant tube and said radius of said second propellant annulus substantially defines a mix rate of said propellant.

8. For a rocket engine including a faceplate, having a propellant side and a combustion side, and an injector formed in the faceplate including a throughbore extending between the propellant side and the combustion side, the injector comprising:

a propellant tube adapted to extend through a portion of said throughbore;

a propellant annulus defined in the faceplate around said throughbore wherein a center of said throughbore defines a center of said propellant annulus;

a passageway extending from the propellant side of the faceplate to said propellant annulus; and wherein a propellant is adapted to flow from said propellant side to said combustion side though the injector;

wherein said passageway is adapted to allow a selected flow rate of the propellant to said propellant annulus.

9. The injector of claim 8, comprising:

wherein said passageway includes a plurality of said passageways;

wherein said plurality of passageways are disposed around said propellant tube at intervals of about 90°; and wherein each of said plurality of passageways extends to said propellant annulus.

10. The injector of claim 8, wherein said propellant tube defines a second propellant annulus.

11. The injector of claim 10, wherein:

a radius of said propellant annulus defines a flow rate of said propellant through said propellant annulus; and a ratio of a radius of said propellant tube and said radius of said propellant annulus substantially defines a mix rate of said propellant.

12. The injector of claim 8, wherein an external dimension of said propellant tube is substantially equal to an internal dimension of said throughbore.

13. A method of forming an injector for a combustion powered engine comprising:

providing a faceplate having a first side and a second side;

forming a throughbore in said faceplate that extends between said first side and said second side;

enlarging a portion of said throughbore thereby forming a first propellant annulus;

forming a second propellant annulus that is coaxial with said first propellant annulus; and wherein a propellant is able to flow though said first propellant annulus and said second propellant annulus.

14. The method of claim 13, wherein providing a faceplate includes:

forming a material into a substantially planar surface; and disposing an inter-propellant plate a distance from said first side.

15. The method of claim 13, wherein forming a throughbore includes:

selecting a propellant tube outer diameter;

forming said throughbore to have a tolerance of less than 0.02 mm relative to the propellant tube outer diameter; and wherein said tolerance substantially eliminates a flow of a propellant between a propellant tube and said faceplate.

16. The method of claim 13, wherein forming a first propellant annulus includes:

providing a drill bit including a pilot portion and a cutting portion, wherein said cutting portion includes a cutting radius larger than said pilot portion;

disposing said pilot portion in said throughbore;

guiding said cutting portion into said faceplate with said pilot portion; and wherein said cutting radius includes a radius selected in relation to a desired flow rate of a propellant.

17. The method of claim 13, wherein forming a second propellant annulus includes:

disposing a propellant tube in said throughbore such that said propellant tube extends at least between said first side and said second side.

18. The method of claim 13, further comprising:
forming a passageway through said faceplate between said first side of said faceplate and said first propellant annulus; and
wherein said passageway allows a selected flow rate of a propellant to said first propellant annulus.

19. A method of forming an injector for a combustion powered engine comprising:
providing a faceplate having a first side and a second side;
forming a throughbore in said faceplate to extend between said first side and said second side;
forming a first propellant annulus by enlarging a portion of said throughbore by guiding a cutting bit into said faceplate with said throughbore;
disposing a propellant tube in said throughbore to form a second propellant annulus; and
forming a passageway in said faceplate between said first side and said first propellant annulus.

20. The method of claim 19, wherein forming a first propellant annulus includes:
providing the cutting bit with a pilot portion and a cutting portion, wherein said cutting portion includes a cutting radius larger than said pilot portion;
disposing said pilot portion in said throughbore; and
guiding said cutting portion into said faceplate with said pilot portion.

21. The method of claim 19, wherein forming a throughbore includes:
selecting a propellant tube outer diameter;
forming said throughbore to have generally tight tolerances to the propellant tube outer diameter; and
wherein generally tight tolerances substantially eliminates a flow of a propellant between a propellant tube and said faceplate.

22. A spacecraft comprising:
a payload compartment;
a propellant source;
an engine including:
a combustion chamber;
a propellant chamber;
a faceplate disposed between said combustion chamber and said propellant chamber;
a propellant injector formed in said faceplate, including:
a first propellant annulus extending through said faceplate;
a second propellant annulus defined by a counterbore in said faceplate arranged substantially coaxial with said first propellant annulus; and
wherein said substantial coaxial arrangement of said second propellant annulus relative to said first propellant annulus allows a propellant from said propellant source to be injected into said combustion chamber and thoroughly intermixed prior to being combusted.

23. An apparatus to allow for substantial mixing of a first fluid with a second fluid into a common chamber, comprising:
an injector to inject the first fluid or the second fluid into the common chamber, including:
a faceplate having a first side and a second side and a bore extending between said first side and said second side;
an injector tube cannula defining a first fluid annulus adapted to engage a portion of said bore;
said faceplate defining a second injector annulus substantially concentric with said injection tube cannula; and
wherein said injector tube and said second injector annulus define a path to deliver a volume of the first fluid or the second fluid to the common chamber.

24. The apparatus of claim 23, further comprising:
a passageway defined through said faceplate extending from said first side of said faceplate to said second injector annulus;
wherein said passageway is adapted to allow a selected flow rate of the first fluid or the second fluid to said second injector annulus.

25. The apparatus of claim 23,
wherein a radius of said second injector annulus defines a flow rate of the first fluid or the second fluid through said second injector annulus; and
wherein a ratio of a radius of said injector tube and said radius of said second injector annulus substantially defines a mix rate of the first fluid and the second fluid.

26. An engine, comprising:
a first propellant source operable to provide a source of a first propellant;
a second propellant source operable to provide a source of a second propellant;
an inter-propellant plate separating said first propellant source and said second propellant source;
a combustion chamber operable to contain a portion of a combustion of the first propellant and the second propellant;
a face plate having a propellant side and a combustion side;
a propellant injector formed in said faceplate, including:
a propellant tube extending through said faceplate and said interpropellant plate;
a propellant bore defined by a bore in said faceplate arranged near said propellant tube; and
wherein said arrangement of said propellant bore relative to said propellant tube allows the first propellant and the second propellant from said first propellant source and said second propellant source to be injected into said combustion chamber; and
a propellant passage operable to transport at least one of the first propellant or the second propellant from at least one of the first propellant source or the second propellant source to said propellant bore.

27. The engine of claim 26, wherein said propellant tube extends through said inter-propellant plate to allow passage of the first propellant to the combustion chamber and said propellant passage extends through a portion of said face plate to interconnect the second propellant source and said propellant bore.

28. The engine of claim 26, wherein each of said propellant tube, said propellant bore, or said propellant passage defines an annulus.

29. The engine of claim 26, wherein a size of at least on of said propellant tube, said propellant bore, said propellant passage, or combinations thereof define a flow rate of at least one of the first propellant or the second propellant from at least one of said first propellant source or said second propellant source to said combustion chamber.

30. A space craft engine, comprising:
a propellant source;
a combustion chamber;
a face plate having a propellant side and a combustion side;

a propellant injector formed in said faceplate, including:

a first propellant passage member extending through said faceplate;

a counterbore formed in said faceplate and defining a second propellant passage relative to said first propellant passage member; and an inter-propellant plate to divide a first propellant and a second propellant in said propellant source;

wherein said coaxial arrangement of said second propellant annulus relative to said first propellant annulus allows a propellant from said propellant source to be injected into said combustion chamber and thoroughly intermixed prior to being combusted;

wherein said first propellant being injected into said combustion chamber through said first propellant annulus and said second propellant being injected into said combustion chamber through said second propellant annulus;

wherein said first propellant includes an oxidizer and said second propellant includes a fuel;

wherein said first annulus is defined by an elongated tube disposed substantially in a center of said second annulus; and wherein said elongated tube operably engages said inter-propellant plate.

* * * * *